United States Patent
Ozcaglar et al.

(10) Patent No.: US 11,403,597 B2
(45) Date of Patent: Aug. 2, 2022

(54) CONTEXTUAL SEARCH RANKING USING ENTITY TOPIC REPRESENTATIONS

(71) Applicant: Microsoft Technology Licensing, LLC, Redmond, WA (US)

(72) Inventors: Cagri Ozcaglar, Sunnyvale, CA (US); Gio Carlo C. Borje, Sunnyvale, CA (US); Sahin C. Geyik, Redwood City, CA (US); Gurwinder S. Gulati, San Francisco, CA (US); Ketan Thakkar, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 16/446,364

(22) Filed: Jun. 19, 2019

(65) Prior Publication Data

US 2020/0402015 A1    Dec. 24, 2020

(51) Int. Cl.
*G06Q 10/10*    (2012.01)
*G06N 20/00*    (2019.01)
*G06F 16/2457*    (2019.01)

(52) U.S. Cl.
CPC ... *G06Q 10/1053* (2013.01); *G06F 16/24578* (2019.01); *G06N 20/00* (2019.01)

(58) Field of Classification Search
None
See application file for complete search history.

(56) References Cited

U.S. PATENT DOCUMENTS

| 2015/0227891 | A1* | 8/2015 | Cohen | G06Q 50/01 |
| | | | | 705/321 |
| 2017/0178031 | A1* | 6/2017 | Zhu | G06F 16/9535 |
| 2017/0344554 | A1* | 11/2017 | Ha | G06F 16/248 |
| 2017/0344954 | A1* | 11/2017 | Xu | G06F 16/242 |
| 2018/0039944 | A1* | 2/2018 | Wang | G06Q 10/1053 |
| 2018/0240042 | A1* | 8/2018 | Boada | G06Q 30/02 |
| 2018/0336241 | A1* | 11/2018 | Noh | G06F 16/242 |

(Continued)

OTHER PUBLICATIONS

Lefebvre-Brossard et al. 2017. Encoding User as More Than the Sum of Their Parts: Recurrent Neural Networks and Word Embedding for People-to-people Recommendation. (UMAP 2017). (Year: 2017).*

(Continued)

*Primary Examiner* — Andrew B Whitaker
(74) *Attorney, Agent, or Firm* — Schwegman Lundberg & Woessner, P.A.

(57) ABSTRACT

The disclosed embodiments provide a system for processing data. During operation, the system obtains a first embedding generated by a topic model from parameters of searches by a first recruiting entity and obtains a set of additional embeddings generated by the topic model from attributes of a set of candidates. Next, the system determines match features that include measures of similarity between the first embedding and each embedding in the set of additional embeddings. The system then applies a machine learning model to the match features and additional features for the candidates to produce a set of scores for the candidates. Finally, the system generates a ranking of the candidates according to the scores and outputs at least a portion of the ranking as search results of a current search by the first recruiting entity.

12 Claims, 6 Drawing Sheets

(56) References Cited

U.S. PATENT DOCUMENTS

2019/0304157 A1\* 10/2019 Amer .................... G06V 20/41
2019/0317728 A1\* 10/2019 Chen .................... G06N 20/00

OTHER PUBLICATIONS

Blei, et al., "Latent Dirichlet Allocation", In Journal of the Machine Learning Research, vol. 3, Mar. 2003, pp. 993-1022.
Geyik, et al., "In-session Personalization for Talent Search", In Proceedings of the 27th ACM International Conference on Information and Knowledge Management, Oct. 22, 2018, pp. 2107-2115.
Hoffman, et al., "Online Learning for Latent Dirichlet Allocation", In Proceedings of the 23rd International Conference on Neural Information Processing Systems—vol. 1, Dec. 6, 2010, 9 Pages.
Ozcaglar, Cagri, "Classification of Email Messages into Topics using Latent Dirichlet Allocation", In Thesis Submitted to the Graduate Faculty of Rensselaer Polytechnic Institute in Partial Fulfillment of the Requirement for the Degree Master of Science—Major Subject—Computer Science, Apr. 2008, 37 Pages.

\* cited by examiner

CONTEXTUAL SEARCH RANKING USING ENTITY TOPIC REPRESENTATIONS

BACKGROUND

Field

The disclosed embodiments relate to techniques for generating search results. More specifically, the disclosed embodiments relate to contextual search ranking using entity topic representations.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as client-server applications and/or devices that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for ranking candidate search results. For example, the rankings include rankings of candidates for jobs, positions, roles, and/or other opportunities. The rankings also, or instead, include rankings or recommendations of connections, follows, mentorships, referrals, online dating matches, and/or other types of relationships or interactions for members of an online network. Each ranking may be produced by ordering the candidates by descending score from one or more machine learning models. As a result, candidates at or near the top of a ranking may be deemed to be better qualified for the corresponding opportunity and/or recommendation than candidates that are lower in the ranking.

More specifically, the disclosed embodiments provide a method, apparatus, and system for performing contextual ranking of candidate search results. In these embodiments, a topic model is created from bag-of-words representations of documents or entities related to a recruiting, hiring, or job-seeking context. For example, the documents include parameters of searches performed by recruiters for job candidates, attributes of the candidates from professional and/or online profiles of the candidates, and/or other text-based data related to recruiting, hiring, or job-seeking entities. Bag-of-words representations of the documents are inputted as training data for the topic model, so that the topic model learns distributions of words in a set of topics and distributions of the topics in the documents.

After the topic model is created, the topic model is used to generate embeddings or vector representations of additional documents related to recruiting, hiring, or job-seeking entities. Continuing with the above example, the topic model is applied to bag-of-words representations of past searches by a recruiter and/or under a recruiting contract and attributes of candidates matching a current search by the recruiter and/or under the recruiting contract to generate a set of embeddings representing the recruiter, recruiting contract, and candidate attributes. The embeddings are used to calculate match features that measure semantic similarity between the searches associated with the recruiter/contract and the candidates' attributes, and the match features are inputted with additional features related to the searches and/or candidates to produce scores representing the likelihoods of positive outcomes related to the candidates and recruiter.

When a score for a candidate-recruiter pair exceeds a threshold, a recommendation related to the candidate and recruiter is generated and/or outputted. For example, the recommendation may be transmitted to the candidate and indicate that the candidate has a high likelihood of receiving a response from a moderator of the opportunity after applying to the opportunity. In another example, the recommendation may be transmitted to the recruiter and indicate that the candidate is highly qualified and/or a good fit for the opportunity. In a third example, candidates for a job may be ranked by descending score, and a subset of the highest-ranked candidates may be outputted as search results for the recruiter performing the search.

By using topic models and embeddings to characterize the semantic context associated with recruiter search parameters and candidate attributes, the disclosed embodiments allow the parameters and attributes to be characterized in the context of human-interpretable topics. In addition, match features calculated between the search parameter embeddings and the candidate attribute embeddings represent semantic similarity of the searches to the candidate attributes, which improves the accuracy of scores outputted by machine learning models that predict or infer outcomes related to the recruiters and candidates. When the scores are used to rank the candidates in search results outputted to the recruiters, the recruiters are able to identify and connect with candidates that meet the recruiters' search criteria, even when the candidates lack attributes that explicitly or exactly match the search criteria. In turn, the search results improve the efficiency and/or effectiveness of job seeking by the candidates and/or placement of jobs by the recruiters.

In contrast, conventional techniques perform ranking of candidates in search results based on exact matches between search parameters and attributes of the candidates. In turn, recommendations and/or search results generated using the conventional techniques may omit some candidates that are relevant or qualified for the opportunities from the rankings and/or search results. The conventional techniques also, or instead, use non-interpretable matrix factorization techniques and/or embeddings to measure semantic similarity between documents and/or entities. Such lack of interpretability interferes with understanding of the factors that influence the generation of recommendations, search results, and/or rankings, which in turn can negatively impact the implementation of changes and/or improvements to the topic model and/or machine learning models. Consequently, the disclosed embodiments improve computer systems, applications, user experiences, tools, and/or technologies related to generating search results, user recommendations, employment, recruiting, and/or hiring.

Contextual Search Ranking Using Entity Topic Representations

Figure 1:
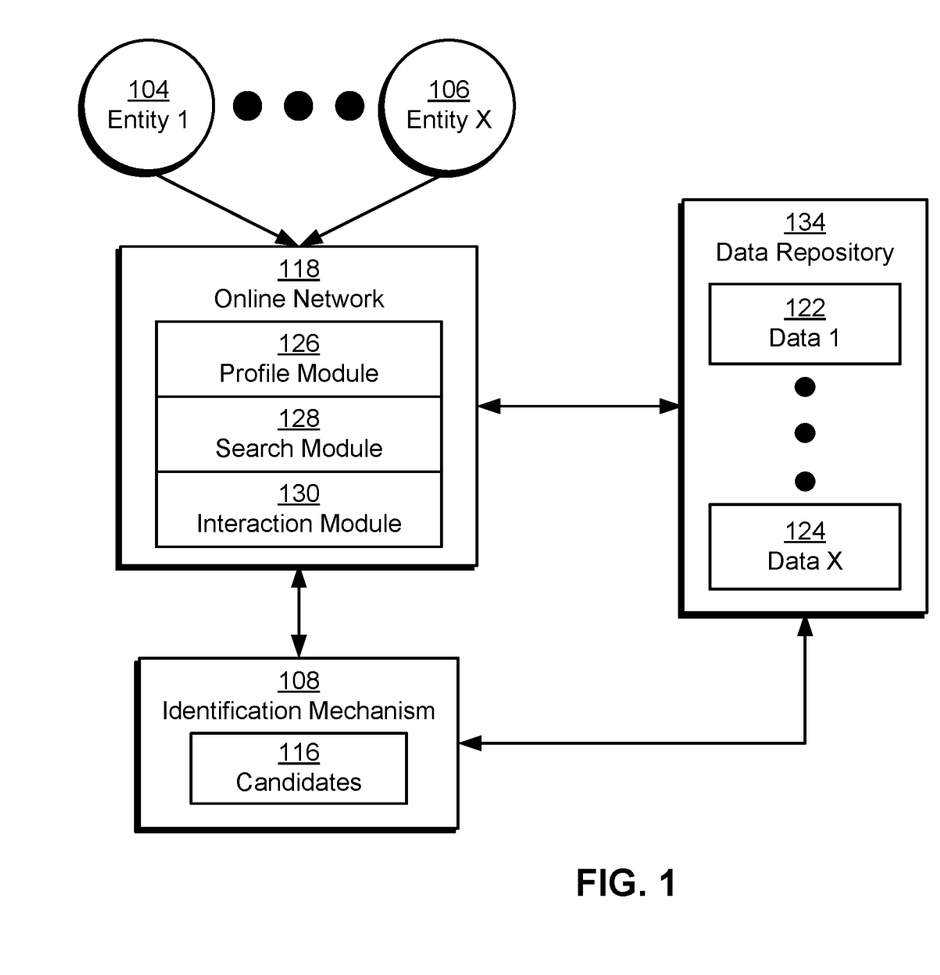
FIG. 1 shows a schematic of a system in accordance with the disclosed embodiments.

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 also allows the entities to view the profiles of other entities in online network 118.

Profile module 126 also, or instead, includes mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is tracked and stored in a database, data warehouse, cloud storage, and/or other data-storage mechanism providing data repository 134.

Data in data repository 134 is then used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to members of online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may output a ranking of candidates for a given set of job qualifications as search results to a recruiter after the recruiter performs a search with the job qualifications included as parameters of the search. In a fourth example, the component(s) may recommend jobs to a candidate based on the predicted relevance or attractiveness of the jobs to the candidate and/or the candidate's likelihood of applying to the jobs.

Those skilled in the art will appreciate that the generation of rankings and/or search results based on exact matches between profile data of candidates 116 and parameters of searches by moderators of opportunities may result in omission of some candidates 116 that are relevant to or qualified for the opportunities from the rankings and/or search results. For example, a recruiter specifies a search term of "AI" in a query related to a job, which returns search results containing candidates 116 with "AI" or "artificial intelligence" listed in their skills or other parts of their profiles. On the other hand, the search results may omit or fail to emphasize candidates 116 with "ML," "machine learning," or "data science" listed in their profiles instead of "AI" or "artificial intelligence," even though such candidates 116 are likely to be relevant to or qualified for the job.

Figure 2A:
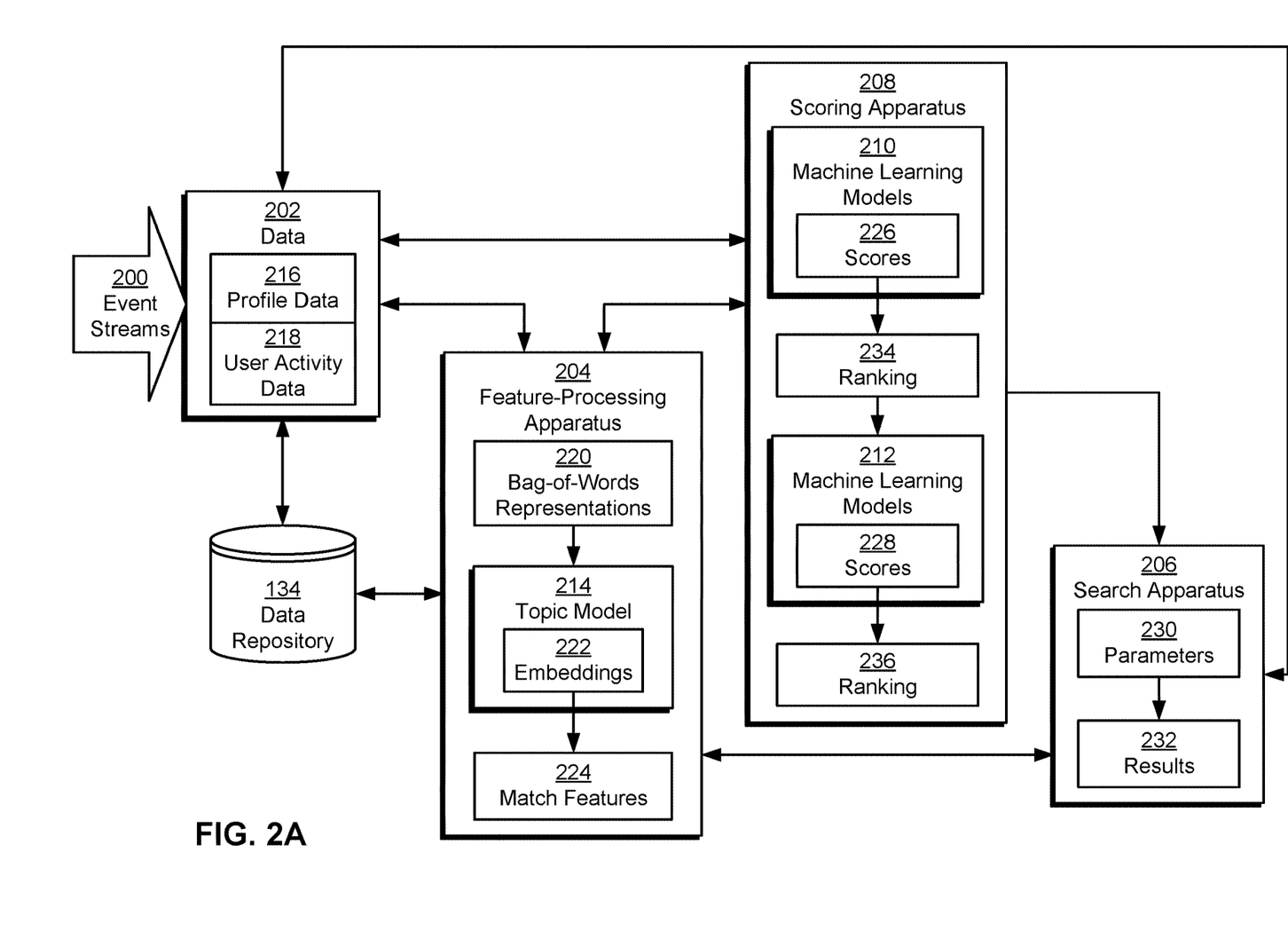
FIG. 2A shows a system for processing data in accordance with the disclosed embodiments.

In one or more embodiments, online network 118 includes functionality to perform contextual ranking of candidates 116 in search results for recruiters and/or other moderators of jobs or opportunities. Such contextual ranking allows candidates 116 to be included and/or ranked in search results based on semantic or contextual matches with the corresponding search parameters instead of exact matches to the search parameters. As shown in FIG. 2, data 202 from data repository 134 is used to generate rankings 234-236 of candidates in response to parameters 230 of searches by moderators of opportunities. Data 202 includes profile data 216 for members of an online platform (e.g., online network 118 of FIG. 1), as well as user activity data 218 that tracks the members' and/or candidates' activity within and/or outside the platform.

Profile data 216 includes data associated with member profiles in the platform. For example, profile data 216 for an online professional network may include a set of attributes for each user, such as demographic (e.g., gender, age range, nationality, location, language), professional (e.g., job title, professional summary, professional headline, employer, industry, experience, skills, seniority level, professional endorsements), social (e.g., organizations to which the user belongs, geographic area of residence), and/or educational (e.g., degree, university attended, certifications, licenses) attributes. Profile data 216 may also include a set of groups to which the user belongs, the user's contacts and/or connections, awards or honors earned by the user, licenses or certifications attained by the user, patents or publications associated with the user, and/or other data related to the user's interaction with the platform.

Attributes of the members are optionally matched to a number of member segments, with each member segment containing a group of members that share one or more common attributes. For example, member segments in the platform may be defined to include members with the same industry, title, location, and/or language.

Connection information in profile data 216 is optionally combined into a graph, with nodes in the graph representing entities (e.g., users, schools, companies, locations, etc.) in the platform. Edges between the nodes in the graph represent relationships between the corresponding entities, such as connections between pairs of members, education of members at schools, employment of members at companies, following of a member or company by another member, business relationships and/or partnerships between organizations, and/or residence of members at locations.

User activity data 218 includes records of user interactions with one another and/or content associated with the platform. For example, user activity data 218 tracks impressions, clicks, likes, dislikes, shares, hides, comments, posts, updates, conversions, and/or other user interaction with content in the platform. User activity data 218 also, or instead, tracks other types of activity, including connections, messages, job applications, job searches, recruiter searches for candidates, interaction between candidates 116 and recruiters, and/or interaction with groups or events. In some embodiments, user activity data 218 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User activity data 218 additionally includes schedules, calendars, and/or upcoming availabilities of the users, which may be used to schedule meetings, interviews, and/or events for the users. Like profile data 216, user activity data 218 is optionally used to create a graph, with nodes in the graph representing members and/or content and edges between pairs of nodes indicating actions taken by members, such as creating or sharing articles or posts, sending messages, sending or accepting connection requests, endorsing or recommending one another, writing reviews, applying to opportunities, joining groups, and/or following other entities.

In one or more embodiments, profile data 216, user activity data 218, and/or other data 202 in data repository 134 is standardized before the data is used by components of the system. For example, skills in profile data 216 are organized into a hierarchical taxonomy that is stored in data repository 134 and/or another repository. The taxonomy models relationships between skills (e.g., "Java programming" is related to or a subset of "software engineering") and/or standardize identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, user activity 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, standardized attributes in data repository 134 are represented by unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 can be updated using records of recent activity received over one or more event streams 200. For example, event streams 200 are generated and/or maintained using a distributed streaming platform such as Apache Kafka (Kafka™ is a registered trademark of the Apache Software Foundation). One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the platform is generated in response to the activity. The record is then propagated to components subscribing to event streams 200 on a nearline basis.

A search apparatus 206 uses data 202 in data repository 134 to identify candidates (e.g., candidates 116 of FIG. 1) that match parameters 230 of a search. For example, search apparatus 206 is provided by a recruiting module or tool that is associated with and/or provided by the platform. Search apparatus 206 includes checkboxes, radio buttons, drop-down menus, text boxes, and/or other user-interface elements that allow a recruiter and/or another moderator involved in hiring for or placing jobs or opportunities to specify parameters 230 related to candidates for an opportunity and/or a number of related opportunities.

Parameters 230 include attributes that are desired or required by the position(s). For example, parameters 230 include thresholds, values, and/or ranges of values for an industry, location, education, skills, past positions, current positions, seniority, overall qualifications, title, seniority, keywords, awards, publications, patents, licenses and certifications, and/or other attributes or fields associated with profile data 216 for the candidates.

In some embodiments, search apparatus 206 matches or converts some or all parameters 230 to standardized attributes in data repository 202. For example, search apparatus 206 converts a misspelled, abbreviated, and/or non-standardized company name, title, location, skill, seniority, and/or other word or phrase in parameters 230 into a standardized identifier or value for a corresponding attribute. Search apparatus 206 also, or instead, adds standardized titles, skills, companies, and/or other attributes that are similar to those specified in parameters 230 to an updated set of parameters 230.

Search apparatus 206 and/or another component then queries data repository 134 for profile data 216 that matches parameters 230. In response to the query, data repository 134 returns member identifiers and/or profile data 216 of candidates that match parameters 230. For example, data repository 134 identifies thousands to tens of thousands of candidates with profile attributes that meet or fit one or more parameters 230.

To improve the quality and/or relevance of search results 232 for a given set of search parameters 230, candidates that meet the criteria represented by parameters 230 are ordered in search results 232 based on features associated with the candidates and/or the recruiter performing the search. As shown in FIG. 2A, a feature-processing apparatus 204 calculates the features using data 202 from data repository 134. Such calculations may occur on an offline, periodic, or batch-processing basis to produce features for a large number of candidates. Some or all features may also, or instead, be generated in an online, nearline, and/or on-demand basis based on recent search parameters (e.g., parameters 230) by recruiters and/or other users interacting with search apparatus 206 and/or recent updates to profile data 216 for the candidates.

First, feature-processing apparatus 204 generates bag-of-words representations 220 of entities involved in a given search. Each bag-of-words representation includes a fixed-length vector with a length that is equal to the total number of words in skills, titles, locations, company names, and/or other types of standardized attributes in data repository 134. Each element of the vector stores a count of a word in a document representing the corresponding entity. Prior to converting the document into a bag-of-words representation, feature-processing apparatus 204 optionally pre-processes text in the document by converting all words in the document to lowercase, removing terms with less than three characters, keeping terms with a minimum term frequency and/or minimum document frequency, concatenating words in a phrase with an underscore (e.g., converting "product manager" into "product_manager"), removing stopwords, and/or performing other text cleaning techniques.

In some embodiments, the entities include one or more recruiting entities performing the search. For example, the recruiting entities include a recruiter, recruiting contract (e.g., a company or other entity that is a customer of the recruiting module or tool providing search apparatus 206), hiring project, and/or other user, group of users, and/or organization involved in recruiting.

Bag-of-words representations 220 of the recruiting entities include counts of standardized parameters 230 in past searches associated with the recruiting entities. For example, each search performed using search apparatus 206 is associated with identifiers for a recruiter and a recruiting contract. A bag-of-words representation of the recruiter is generated by aggregating parameters 230 of searches performed by the recruiter over a period (e.g., the last 30 days), and a bag-of-words representation of the recruiting contract is generated by aggregating a potentially different set of parameters 230 of searches performed under the recruiting contract over the same period. Each bag-of-words representation thus includes the count of different skills, titles, locations, company names, company sizes, seniorities, educational attributes, and/or other types of attributes in parameters 230 specified in the searches performed by the corresponding entity over the period.

The entities also include candidates with profile data 216 that matches one or more parameters 230 of the search, as identified and/or retrieved by data repository 134 and/or search apparatus 206. Bag-of-words representations 220 of the candidates thus include counts of different skills, titles, locations, company names, company sizes, seniorities, educational attributes, and/or other types of profile data 216 for the candidates.

Next, feature-processing apparatus 204 uses a topic model 214 to generate embeddings 222 of bag-of-words representations 220 of the entities. For example, topic model 214 includes a Latent Dirichlet Allocation (LDA) model that generates an embedding of a given bag-of-words representation of a document as a distribution of a fixed set of topics in the document. Feature-processing apparatus 204 and/or another component of the system create the LDA model from bag-of-words representations 220 of searches associated with recruiters, recruiting contracts, and/or other recruiting entities, as well as bag-of-words representations 220 of some or all profile data 216 in data repository 134.

Figure 2B:
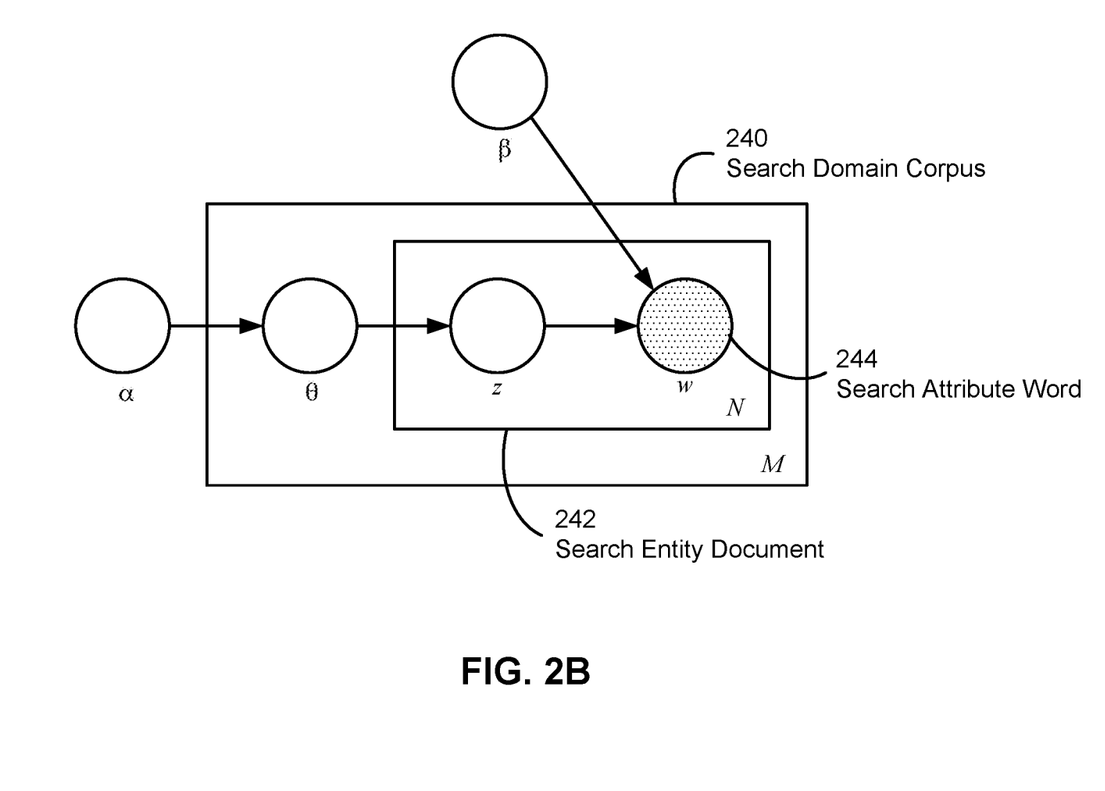
FIG. 2B shows a plate notation of an example topic model in accordance with the disclosed embodiments.

As shown in FIG. 2B, a plate notation of an example LDA topic model 214 includes parameters α, β, θ, z, w, M, and N. The outer plate represents a search domain corpus 240, which includes documents representing entities that perform searches (e.g., recruiters and recruiting contracts), as well as documents representing entities that appear in search results of the searches (e.g., candidates). Within the outer plate, M represents the number of search entity documents in the corpus, and $\theta_i$ represents a Dirichlet random variable that models the distribution of k topics in a given document i in the corpus. The uniform Dirichlet prior on $\theta_i$ is represented by a (i.e., θ=Dir(α)).

The inner plate represents each search entity document 242 (i.e., a document representing a given search entity) within search domain corpus 240. Within the inner plate, N represents the number of words in a given search entity document 242, $w_{ij}$ represents the jth search attribute word 244 (e.g., a word in a skill, title, location, company name, company size, seniority, educational attribute, and/or other attribute) in document i, $z_i$ represents the i-th topic, and $\beta_{ij}$ represents the probability that word $w_j$ belongs to topic $z_i$. Shading associated with the circle representing w in the plate notation indicates that each $w_1$ is observable, while the remaining circles are non-shaded to indicate that the corresponding variables are latent variables. Each word $w_{ij}$ additionally depends on β, which represents the uniform Dirichlet prior on the per-topic word distribution (i.e., $\beta_{ij}$=P($w_j$=1|$z_i$=1).

To infer topics in search domain corpus 240, the LDA model uses a generative process that represents each search entity document 242 as a random mixture over latent topics, where each topic is characterized by a distribution over a number of search attribute words (e.g., search attribute word 244). For a corpus D of M documents, with each document having a length N, the generative process performs the following:

Choose N~Poission(ξ)
Choose θ~Dir(α), where α is a symmetric Dirichlet parameter.
For each of the word positions i, j, where i∈{1, ..., M} and j∈{1, ..., N}:
  Choose a topic $z_i$~Multinomial($\theta_i$).
  Choose a word $w_j$ from p($w_j$|$z_i$, β), which is a multinomial probability distribution conditioned on topic $z_i$.

Returning to the description of FIG. 2A, the component combines bag-of-words representations 220 of the recruiting entities' searches and profile data 216 for candidates into a document-word matrix. Each row in the document-word matrix represents a document (e.g., a set of attributes associated with searches by a recruiting entity or a profile of a candidate), and each column in the document-term matrix represents a word. The component converts the words and documents into a small set of topics and generates the LDA model as a topic-word matrix, where each row in the topic-word matrix represents a topic and each column in the topic-word matrix represents a word. Each topic in the topic-word matrix is represented as a probability distribution over words, so that each element in the row representing the topic stores a value representing the relevance of the word to the topic. The topic-word matrix is initialized with random values, which are subsequently updated using an expectation maximization (EM) technique, variational Bayes technique, Gibbs sampling technique, expectation propagation (EP) technique, Laplace approximation technique, Markov Chain Monte Carlo technique, and/or another technique for approximating the posterior distribution of the latent variables given a document:

$$p(\theta, z \mid w, \alpha, \beta) = \frac{p(\theta, z, w \mid \alpha, \beta)}{p(w \mid \alpha, \beta)}$$

In some embodiments, topic model 214 is used to generate an interpretable representation of topics in the documents and words in the topics. An example mapping of topics generated from recruiting entities and profile data 216 for candidates to the top-10 highest probability words in the topics includes the following:

| Topic Name | Words |
| --- | --- |
| retail | 'retail', 'merchandising', 'inventory_management', 'store_management', 'retail_sales', 'visual_merchandising', 'merchandise', 'time_management', 'fashion', 'stocks' |
| data science | 'data_mining', 'data_analysis', 'data_science', 'data_analytics', 'programming_language', 'pattern_recognition', 'machine_learning', 'computer_science', 'science', 'statistics' |
| healthcare | 'healthcare', 'medicine', 'hospitals', 'clinical_research', 'healthcare_management', 'nursing', 'working_with_physicians', 'hit', 'rules', 'healthcare_information_technology', 'emr' |
| finance | 'financial_analysis', 'reporting', 'financial_reporting', 'auditing', 'financial_accounting', 'account_reconciliation', 'accounts_payable', 'tax', 'accounts_receivable', 'internal_audit' |
| hospitality | 'food', 'beverage', 'hospitality_industry', 'restaurant_management', 'hotel_management', 'catering', 'tourism', 'hospitality_management', 'cooking', 'event_management' |
| human resources | 'recruiting', 'human_resource', 'temporary_placement', 'skilled_labor', 'sourcing', 'interviewing', 'technical_recruiting', 'search', 'mergers', 'acquisitions' |

In the example mapping above, each topic name is generated by a human based on the top words in the topic and replaces a topic number representing the corresponding topic in an LDA model.

In turn, feature-processing apparatus 204 uses the LDA model to generate embeddings 222 for subsequent bag-of-words representations 220, such as bag-of-words representations 220 of one or more recruiting entities performing a search and a set of candidates matching parameters 230 of the search. In particular, feature-processing apparatus 204 multiplies a first vector containing a bag-of-words representation with a transpose of the topic-word matrix to produce a second vector containing the distribution of topics in the bag-of-words representation. The second vector thus represents an embedding of the higher-dimensional bag-of-words representation into a lower-dimensional latent vector space.

Figure 2C:
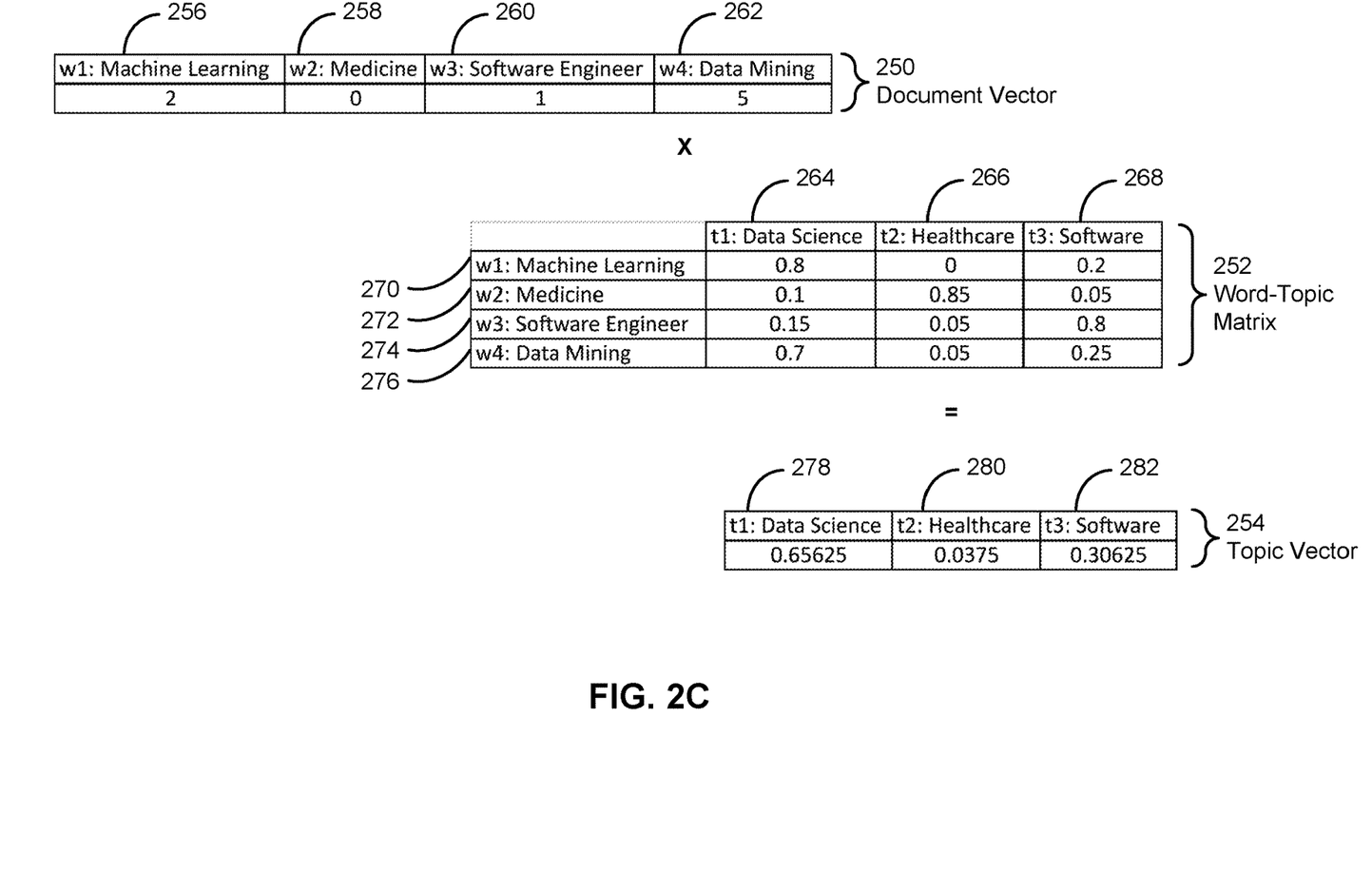
FIG. 2C shows an example use of a topic model to generate a distribution of topics in a document in accordance with the disclosed embodiments.

As shown in FIG. 2C, an example document vector 250 includes a bag-of-words representation of a document (e.g., search entity document 242 of FIG. 2B). Document vector 250 includes a first element 256 storing a count of 2 for a word of "Machine Learning," a second element 258 storing a count of 0 for a word of "Medicine," a third element 260 storing a count of 1 for a word of "Software Engineer," and a fourth element 262 storing a count of 5 for a word of "Data Mining."

To generate a topic vector 254 containing a distribution of topics in the document, document vector 250 is multiplied by a word-topic matrix 252 that is the transpose of the topic-word matrix representing an LDA model. Word-topic matrix 252 includes four rows 270-276 that have a 1:1 mapping to the four elements 256-262 of document vector 250. Row 270 represents the word of "Machine Learning," row 272 represents the word of "Medicine," row 274 represents the word of "Software Engineer," and row 276 represents the word of "Data Mining."

Word-topic matrix 252 also includes three columns 264-268 representing three topics found in the corpus of documents (e.g., search domain corpus 240 of FIG. 2B) used to create the LDA model. Column 264 represents a topic of "Data Science," column 266 represent a topic of "Healthcare," and column 268 represents a topic of "Software." Each column in word-topic matrix 252 stores the distribution of words for a corresponding topic, and each row in word-topic matrix 252 stores the distribution of topics for a corresponding word.

As mentioned above, topic names for topics associated with columns 264-268 may be generated by a human based on the distribution of words in the topic. For example, the topic name of "Data Science" is selected for column 264 based on the higher probabilities of 0.8 for the word of "Machine Learning" and 0.7 for the word of "Data Mining" in the topic. The topic name of "Healthcare" is selected for column 266 based on the higher probability of 0.85 for the word of "Medicine" in the topic. The topic name of "Software" is selected for column 268 based on the higher probability of 0.8 for the word "Software Engineer" in the topic.

More specifically, topic vector 254 contains the distribution of topics in the document represented by document vector 250. The first element 278 of topic vector 254 represents the topic of "Data Science," the second element 280 of topic vector 254 represents the topic of "Healthcare," and the third element 282 of topic vector 252 represents the topic of "Software." The value stored in each element of topic vector 254 is calculated as the dot product of word counts in document vector 250 with the distribution of the corresponding words in each topic represented by a column in word-topic matrix 252.

The values in elements 278-282 of topic vector 254 are then normalized so that each value represents the probability of the corresponding topic in the document represented by document vector 250. Within the topic space, the document has the highest probability of 0.65625 for the topic of "Data Science," the second highest probability of 0.30625 for the topic of "Software," and the third highest probability of 0.0375 for the topic of "Healthcare." Consequently, topic vector 254 represents an embedding or encoding of a higher-dimensional document vector 250 into a lower-dimensional topic space.

Returning to the description of FIG. 2A, feature-processing apparatus 204 uses embeddings 222 of bag-of-words representations 220 of recruiting entities and candidates associated with a search to calculate match features 224 between the recruiting entities and candidates. Match features 224 include measures of semantic similarity between bag-of-words representations 220 of a given recruiting entity and a corresponding candidate. For example, match features 224 include a cosine similarity and a Jensen-Shannon (JS) divergence between an embedding of a recruiter's past searches and an embedding of each candidate's profile attributes. Match features 224 also include a cosine similarity and JS-divergence between an embedding of a recruiting contract's past searches and the embedding of each candidate's profile attributes. As a result, feature-processing apparatus 204 generates four match features 224 (i.e., recruiter-candidate cosine similarity, recruiter-candidate JS divergence, contract-candidate cosine similarity, contract-candidate JS divergence) for each candidate that matches parameters 230 of the search associated with a given recruiter and recruiting contract.

Feature-processing apparatus 204 additionally includes functionality to generate additional features associated with each candidate and/or the recruiter. For example, the additional features include match scores between individual parameters 230 or groups of parameters 230 and the candidate's corresponding attributes (e.g., industry, location, skills, seniority, etc.), reputation scores for skills specified in parameters 230, and/or other measures of the candidate's qualifications compared with the corresponding criteria in parameters 230. In another example, the additional features include a job-seeker score that classifies a candidate's job-seeking status as a job seeker or non-job-seeker and/or estimates the candidate's level of job-seeking interest. In a third example, the additional features include the amount of time since a candidate has expressed openness or availability for new opportunities (e.g., as a profile setting and/or job search setting). In a fourth example, the additional features include the number of times the recruiter has viewed a given candidate and/or an affinity score between the recruiter and the candidate, which is calculated using a matrix decomposition of messages sent and/or accepted between a set of recruiters and a set of candidates.

In turn, features from feature-processing apparatus 204 are used to order candidates in search results 232 that are returned in response to search parameters 230 from the recruiter based on the relevance of the candidates to parameters 230, the openness of the candidates to jobs or opportunities, interaction between the candidates and the recruiter, and/or other criteria. More specifically, a scoring apparatus 208 inputs match features 224 and/or the additional features into one or more machine learning models 210-212 to generate one or more sets of scores 226-228 for the candidates. Each set of scores 226-228 is used to produce a corresponding ranking (e.g., rankings 234-236) of the candidates, and one or more rankings are used to populate search results 232 that are returned in response to a set of search parameters 230.

For example, machine learning models 210-212 include decision trees, random forests, gradient boosted trees, regression models, neural networks, deep learning models, ensemble models, and/or other types of models that generate multiple rounds of scores 226-228 and/or rankings 234-236 for the candidates according to different sets of criteria and/or thresholds. Each score generated by a given machine learning model represents the likelihood of a positive outcome between the candidate and recruiter (e.g., the candidate accepting a message from the recruiter, given an impression of the candidate by the recruiter in search results 232; the recruiter responding to the candidate's job application; placing or advancing the candidate in a hiring pipeline for the job; scheduling of an interview of the candidate for the job; hiring of the candidate for the job; etc.). Thus, an improvement in the performance and/or precision of each machine learning model may produce a corresponding increase in the rate of positive outcomes after the candidates are viewed by recruiters in search results 232.

In one or more embodiments, scoring apparatus 208 uses one or more machine learning models 210 to generate a first set of scores 226 from match features 224 and/or a first set of additional features for all candidates that match parameters 230 (e.g., all candidates returned by data repository 134 in response to a query containing parameters 230). Scoring apparatus 208 also generates ranking 234 by ordering the candidates by descending score from the first set of scores 226.

Next, scoring apparatus 208 obtains a highest-ranked subset of candidates from ranking 234 (e.g., the top 1,000 candidates in ranking 234) and inputs match features 224 and/or a second set of additional features for the highest-ranked subset of candidates into one or more additional machine learning models 212. Scoring apparatus 208 obtains a second set of scores 228 from machine learning models 212 and generates ranking 236 by ordering the subset of candidates by descending score from the second set of scores 228. As a result, machine learning models 210 may perform a first round of scoring and ranking 234 and/or filtering of the candidates using a first of criteria, and machine learning models 212 may perform a second round of scoring and ranking 234 of a smaller number of candidates using a second set of criteria. The number of candidates scored by machine learning models 212 may be selected to accommodate performance and/or scalability constraints associated with generating results 232 in response to searches received through search apparatus 206.

Search apparatus 206 then uses scores 226-228 and/or rankings 234-236 from scoring apparatus 208 to generate search results 232 that are displayed and/or outputted in response to the corresponding search parameters 230. For example, search apparatus 206 may paginate some or all candidates in ranking 236 into subsets of search results 232 that are displayed as the recruiter scrolls through the search results 232 and/or navigates across screens or pages containing the search results 232.

By using topic model 214 and embeddings 222 to characterize the semantic context associated with recruiter search parameters 230 and candidate attributes, the system of FIG. 2A allows the parameters and attributes to be characterized in the context of human-interpretable topics. In addition, match features 224 calculated between the search parameter embeddings 222 and the candidate attribute embeddings 222 represent semantic similarity of the searches to the candidate attributes, which improves the accuracy of scores 226-228 outputted by machine learning models 210-212. Because the candidates are ranked by scores 226 or 228 in search results outputted to the recruiters, the recruiters are able to identify and connect with candidates that meet the recruiters' search criteria, even when the candidates lack attributes that explicitly or exactly match the search criteria. In turn, the search results improve the efficiency and/or effectiveness of job seeking by the candidates and/or placement of jobs by the recruiters.

In contrast, conventional techniques perform ranking of candidates in search results based on exact matches between search parameters and attributes of the candidates. In turn, recommendations and/or search results generated using the conventional techniques may omit some candidates that are relevant or qualified for the opportunities from the rankings and/or search results. The conventional techniques also, or instead, use non-interpretable matrix factorization techniques and/or embeddings to measure semantic similarity between documents and/or entities. Such lack of interpretability interferes with understanding of the factors that influence the generation of recommendations, search results, and/or rankings, which in turn can negatively impact the implementation of changes and/or improvements to topic model 214 and/or machine learning models 210-212. Consequently, the disclosed embodiments improve computer systems, applications, user experiences, tools, and/or technologies related to generating search results, user recommendations, employment, recruiting, and/or hiring.

Those skilled in the art will appreciate that the system of FIG. 2A may be implemented in a variety of ways. First, feature-processing apparatus 204, scoring apparatus 208, search apparatus 206, and/or data repository 134 may be provided by a single physical machine, multiple computer systems, one or more virtual machines, a grid, one or more databases, one or more filesystems, and/or a cloud computing system. Feature-processing apparatus 204, scoring apparatus 208, and search apparatus 206 may additionally be implemented together and/or separately by one or more hardware and/or software components and/or layers.

Second, a number of machine learning models and/or techniques may be used to generate embeddings 222, scores 226-228, and/or rankings 234-236. For example, topic model 214 may be implemented using Latent Semantic Analysis (LSA), probabilistic LSA (pLSA), non-negative matrix factorization (NMF), a word embedding model, a deep structured semantic model (DSSM), and/or another type of model that models semantic similarities within text in a set of documents.

Similarly, the functionality of each machine learning model employed by scoring apparatus 208 may be provided by a regression model, artificial neural network, support vector machine, decision tree, random forest, gradient boosted tree, naïve Bayes classifier, Bayesian network, clustering technique, collaborative filtering technique, deep learning model, hierarchical model, and/or ensemble model. The retraining or execution of topic model 214 and/or each machine learning model may also be performed on an offline, online, and/or on-demand basis to accommodate requirements or limitations associated with the processing, performance, or scalability of the system and/or the availability of features used to train the machine learning model.

Multiple versions of topic model 214 may further be adapted to different subsets of candidates, recruiters, and/or search parameters 230. For example, feature-processing apparatus 204 uses one version of topic model 214 to generate one embedding containing a distribution of topics associated with skills in a series of searches and/or a candidate's profile data. Feature-processing apparatus 204 uses another version of topic model 214 to generate another embedding containing a distribution of topics associated with titles in the same series of searches and/or profile data. Feature-processing apparatus 204 then concatenates the embeddings into a final embedding that contains separate distributions of topics for skills and titles in the searches and/or profile data. Alternatively, the same topic model 214 may be used to generate embeddings 222 for all bag-of-words representations 220 of documents or entities associated with searches performed using search apparatus 206.

Similarly, each machine learning model may be used to generate scores for different member or customer segments associated with candidates or recruiters, or one machine learning model may be used to generate one or more sets of scores (e.g., scores 226-228) for all candidates and/or recruiters in the platform. Moreover, the functionality of machine learning models 210-212 may be merged into a single machine learning model that performs a single round of scoring and ranking of the candidates and/or separated out into more than two machine learning models that perform multiple rounds of scoring, filtering, and/or ranking of the candidates.

Third, the system of FIG. 2A may be adapted to generate search results 232 for various types of searches and/or entities. For example, the functionality of the system may be used to improve and/or personalize search results containing candidates for academic positions, artistic or musical roles, school admissions, fellowships, scholarships, competitions, club or group memberships, matchmaking, and/or other types of opportunities. In another example, the system of FIG. 2A may be used to characterize semantic similarity between parameters of a job search performed by a job seeker and corresponding attributes in a set of jobs. The semantic similarity may then be inputted into one or more machine learning models that score and/rank the jobs by relevance to the job search and/or the job seeker's profile data, and search results and/or recommendations may be generated and outputted to the job seeker based on the ranked jobs.

Figure 3:
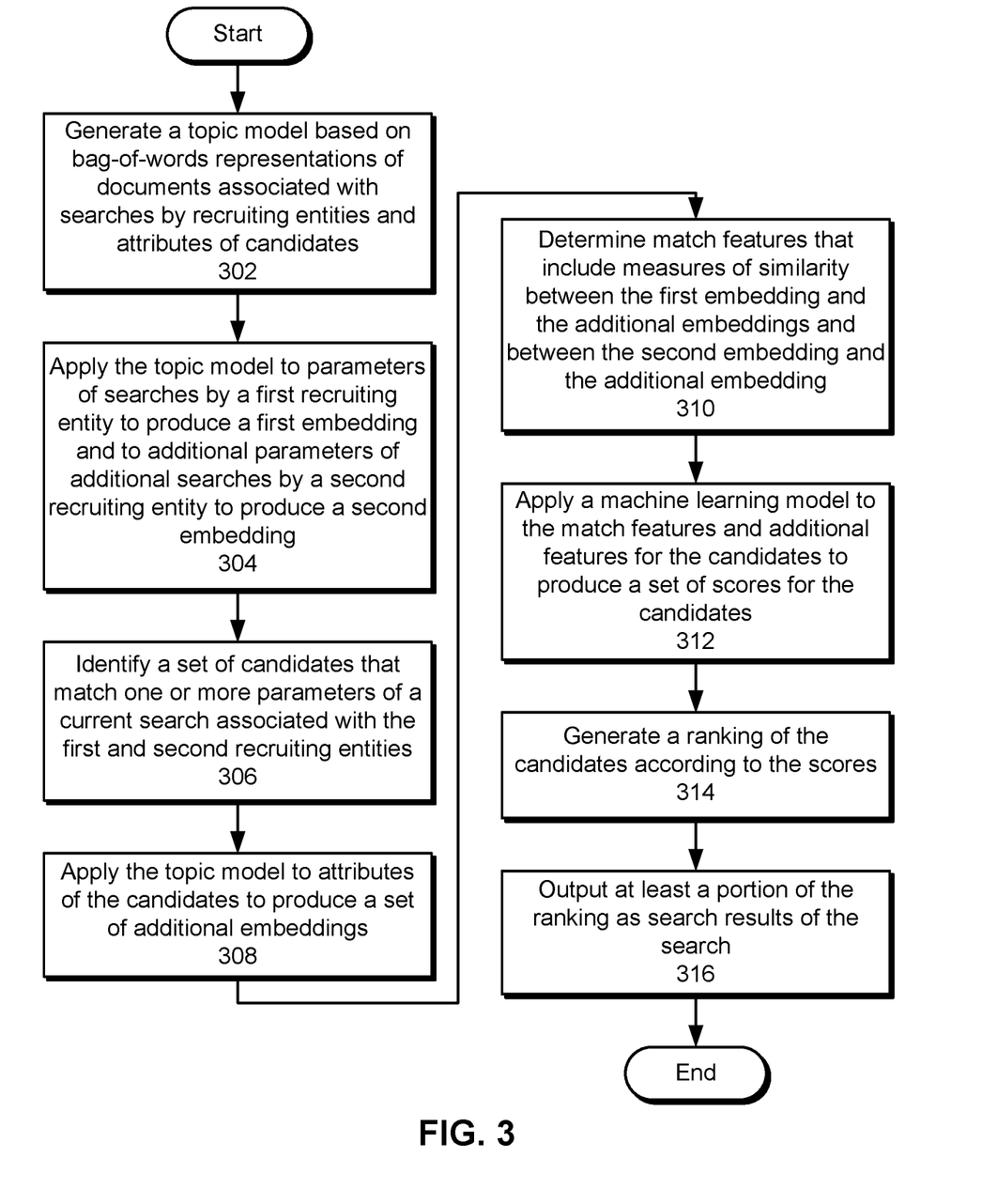
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a topic model is generated based on bag-of-words representations of documents associated with searches by recruiting entities and attributes of candidates (operation 302). For example, the topic model includes an LDA model that determines the distribution of topics in a corpus of words from recruiter searches and user profiles, as well as the distribution of words in each topic.

Next, the topic model is applied to parameters of searches by a first recruiting entity to produce a first embedding and to additional parameters of additional searches by a second recruiting entity to produce a second embedding (operation 304). For example, the first and second recruiting entities include a recruiter and a recruiting contract. The embeddings are generated by the LDA model from bag-of-words representations of searches performed under the recruiter and recruiting contract.

A set of candidates that match one or more parameters of a current search associated with the first and second recruiting entities is also identified (operation 306), and the topic model is applied to attributes of the candidates to produce a set of additional embeddings (operation 308). For example, the candidates include members or users with profile attributes that match one or more skills, titles, functions, seniorities, locations, companies, educational attributes, and/or other parameters inputted into a search by a recruiter and/or under a recruiting contract. The LDA model is then used to generate embeddings of some or all attributes in the candidates' profiles.

In one or more embodiments, multiple topic models are used to generate embeddings associated with the recruiting entities and candidates. For example, a first LDA model is applied to skills in a document representing a recruiting entity or candidate to generate a first sub-embedding, and a second LDA model is applied to titles in the document to generate a second sub-embedding. The first and second sub-embeddings are then combined (e.g., concatenated) into an embedding for the document.

Match features that include measures of similarity between the first embedding and the additional embeddings and between the second embedding and the additional embeddings are then determined (operation 310). For example, the match features include a cosine similarity between the first embedding and each additional embedding, a Jensen-Shannon divergence between the first embedding and each additional embedding, a cosine similarity between the second embedding and each additional embedding, and/or a Jensen-Shannon divergence between the second embedding and each additional embedding.

A machine learning model is applied to the match features and additional features or the candidates to produce a set of scores for the candidates (operation 312). For example, the additional features include, but are not limited to, an indication of an exact match between an attribute of each candidate and a corresponding parameter of the current search, a reputation score for a skill of the candidate, and/or a job-seeking status of the candidate. A tree-based model, regression model, deep learning model, and/or another type of model is used to calculate, from the match features and additional features for each candidate, a relevance score that represents the likelihood of a positive outcome between the candidate and the recruiter and/or the extent to which the candidate is qualified for the opportunity.

A ranking of the candidates according to the scores is generated (operation 314), and at least a portion of the ranking is outputted as search results of the search (operation 316). For example, the candidates are ranked by descending score, and some or all of the ranking is included in search results that are displayed, transmitted, and/or otherwise outputted to a recruiter and/or another moderator conducting the search.

Figure 4:
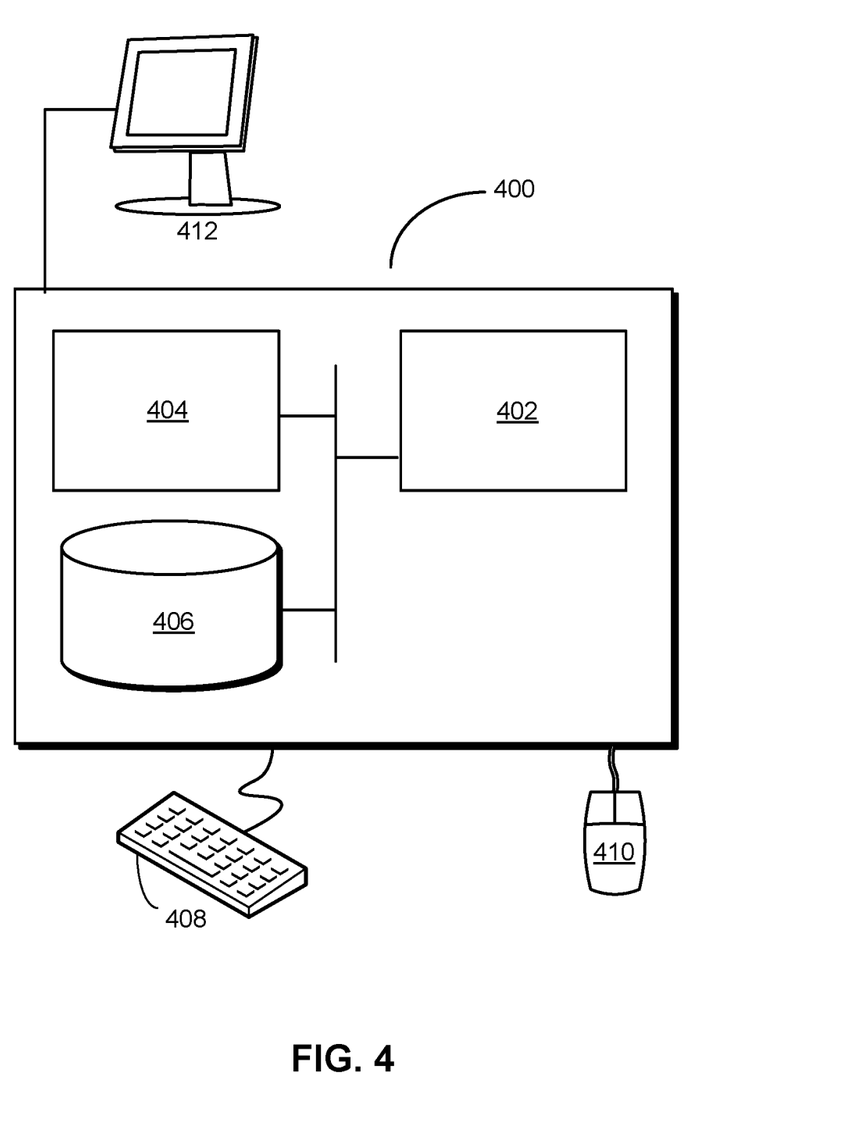
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing data. The system includes a feature-processing apparatus, a scoring apparatus, and a search apparatus, one or more of which may alternatively be termed or implemented as a module, mechanism, or other type of system component. The feature-processing apparatus obtains a first embedding generated by a topic model from parameters of searches by a first recruiting entity and obtains a set of additional embeddings generated by the topic model from attributes of a set of candidates. Next, the feature-processing apparatus determines match features that include measures of similarity between the first embedding and each embedding in the set of additional embeddings. The scoring apparatus then applies a machine learning model to the match features and additional features for the set of candidates to produce a set of scores for the candidates. The scoring apparatus also generates a ranking of the candidates according to the scores. Finally, the search apparatus outputs at least a portion of the ranking as search results of a current search by the first recruiting entity.

In addition, one or more components of computer system 400 may be remotely located and connected to the other components over a network. Portions of the present embodiments (e.g., feature-processing apparatus, scoring apparatus, search apparatus, data repository, online network, etc.) may also be located on different nodes of a distributed system that implements the embodiments. For example, the present embodiments may be implemented using a cloud computing system that generates candidate search results for searches performed by a set of remote moderators.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   generating a bag-of-words representation for each document in a first plurality of documents, each document in the first plurality of documents comprising words used as search parameters specified by a user of a plurality of users associated with a common recruiting contract;

generating a bag-of-words representation for each document in a second plurality of documents, each document in the second plurality of documents comprising words indicating attributes of a job candidate as specified in a user profile of the job candidate;

using the bag-of-words representations for the first plurality of documents and the second plurality of document as training data, training a topic model to derive embeddings for documents;

obtaining a first embedding for one or more documents comprising parameters of one or more searches by a first recruiting entity, by:

generating a bag-of-words representation of the parameters from the one or more searches by the first recruiting entity; and applying the topic model to the bag-of-words representation of the parameters to generate the first embedding;

obtaining a set of additional embeddings, wherein each embedding in the set of additional embeddings is for attributes of a candidate in a set of candidates, the additional embeddings derived by:

identifying the set of candidates that match one or more parameters of a current search; and applying the topic model to the attributes of each candidate in the set of candidates to generate the set of additional embeddings;

determining, by one or more computer systems, for each pairing of the first embedding and an embedding in the set of additional embeddings at least one match feature comprising a measure of similarity between the first embedding and the embedding in the set of additional embeddings;

applying, by the one or more computer systems, a machine learning model to each match feature and additional features for each candidate in the set of candidates to produce a score for each candidate in the set of candidates;

generating a ranking of the set of candidates according to the score corresponding with each candidate; and outputting at least a portion of the ranking as search results of a current search by the first recruiting entity.

2. The method of claim 1, wherein obtaining deriving the first embedding comprises:

applying a first topic model to a first subset of parameters of the one or more searches to generate a first sub-embedding;

applying a second topic model to a second subset of parameters of the one or more searches to generate a second sub-embedding; and combining the first and second sub-embeddings into the first embedding.

3. The method of claim 1, wherein determining the at least one match feature comprising the measure of similarity between the first embedding and the embedding in the set of additional embeddings comprises:

calculating a first match feature as a cosine similarity between the first embedding and an embedding in the set of additional embeddings; and calculating a second match feature as a Jensen-Shannon divergence between the first embedding and an embedding in the set of additional embeddings.

4. The method of claim 1, wherein the additional features comprise at least one of:

an exact match between an attribute of a candidate and one or more parameters of the current search;

a reputation score for a skill of the candidate; and a job-seeking status of the candidate.

5. The method of claim 1, wherein the first embedding and the set of additional embeddings comprise a distribution of topics in a document.

6. The method of claim 1, wherein the attributes of the set of candidates comprise at least one of:

a skill;
a title;
a location;
an industry;
a seniority;
a company; and
an educational background.

7. A system, comprising:

one or more processors; and memory storing instructions that, when executed by the one or more processors, cause the system to:

generate a bag-of-words representation for each document in a first plurality of documents, each document in the first plurality of documents comprising words used as search parameters specified by a user of a plurality of users associated with a common recruiting contract;

generate a bag-of-words representation for each document in a second plurality of documents, each document in the second plurality of documents comprising words indicating attributes of a job candidate as specified in a user profile of the job candidate;

use the bag-of-words representations for the first plurality of documents and the second plurality of document as training data to train a topic model to derive embeddings for documents;

generate a first embedding from one or more documents comprising parameters of one or more searches by a first recruiting entity, by:

generating a bag-of-words representation of the parameters of the one or more searches by the first recruiting entity; and applying the topic model to the bag-of-words representations of the parameters to generate the first embedding;

for each candidate in a set of candidates, generate a set of additional embeddings for attributes of the candidate, by identifying the set of candidates that match one or more parameters of a current search; and applying the topic model to the attributes of each candidate in the set of candidates to generate the set of additional embeddings;

determine at least one match feature for each pairing of the first embedding and an embedding in the set of additional embeddings, the at least one match feature comprising a measure of similarity between the first embedding and the embedding in the set of additional embeddings; and output the match features for use in generating search results of a current search by the first recruiting entity.

8. The system of claim 7, wherein outputting the match features for use in generating search results of the current search by the first recruiting entity comprises:

inputting the match features with additional features of the set of candidates into a machine learning model;

receiving, as output from the machine learning model, a set of scores for the set of candidates;

generating a ranking of the set of candidates according to the set of scores; and outputting at least a portion of the ranking as search results of the current search.

9. The system of claim 7, wherein the instructions that, when executed by the one or more processors, cause the system to:
for each pairing of the first embedding and an embedding in the set of additional embeddings:
calculate a first match feature as a cosine similarity between the first embedding and the embedding in the set of additional embeddings; and
calculate a second match feature as a Jensen-Shannon divergence between the first embedding and the embedding in the set of additional embeddings.

10. The system of claim 7, wherein the first embedding and the set of additional embeddings comprise a distribution of topics in a document.

11. A non-transitory computer-readable storage medium storing instructions that when executed by a computer cause the computer to perform a method, the method comprising:
generating a bag-of-words representation for each document in a first plurality of documents, each document in the first plurality of documents comprising words used as search parameters specified by a user of a plurality of users associated with a common recruiting contract;
generating a bag-of-words representation for each document in a second plurality of documents, each document in the second plurality of documents comprising words indicating attributes of a job candidate as specified in a user profile of the job candidate;
using the bag-of-words representations for the first plurality of documents and the second plurality of document as training data, training a topic model to derive embeddings for words in a document;
obtaining a first embedding for one or more documents comprising parameters of one or more searches by a first recruiting entity, by:
generating a bag-of-words representation of the parameters from the one or more searches by the first recruiting entity; and
applying the topic model to the bag-of-words representation of the parameters to generate the first embedding;
obtaining a set of additional embeddings, wherein each embedding in the set of additional embeddings is for attributes of a candidate in a set of candidates, the additional embeddings derived by:
identifying the set of candidates that match one or more parameters of a current search; and
applying the topic model to the attributes of each candidate in the set of candidates to generate the set of additional embeddings;
determining, by one or more computer systems, for each pairing of the first embedding and an embedding in the set of additional embeddings at least one match feature comprising a measure of similarity between the first embedding and the embedding in the set of additional embeddings;
applying, by the one or more computer systems, a machine learning model to each match feature and additional features for each candidate in the set of candidates to produce a score for each candidate in the set of candidates;
generating a ranking of the set of candidates according to the score corresponding with each candidate; and
outputting at least a portion of the ranking as search results of a current search by the first recruiting entity.

12. The non-transitory computer readable storage medium of claim 11, wherein determining, for each pairing of the first embedding and an embedding in the set of additional embeddings, the at least one match feature comprising the measure of similarity between the first embedding and the embedding in the set of additional embeddings comprises:
calculating a first match feature as a cosine similarity between the first embedding and each embedding in the set of additional embeddings; and
calculating a second match feature as a Jensen-Shannon divergence between the first embedding and each embedding in the set of additional embeddings.

* * * * *